July 10, 1951 R. B. GUNN, JR 2,560,438
LOAD GRIPPER FOR VEHICLES SUCH AS LIFT TRUCKS
Filed Jan. 2, 1948 2 Sheets-Sheet 1
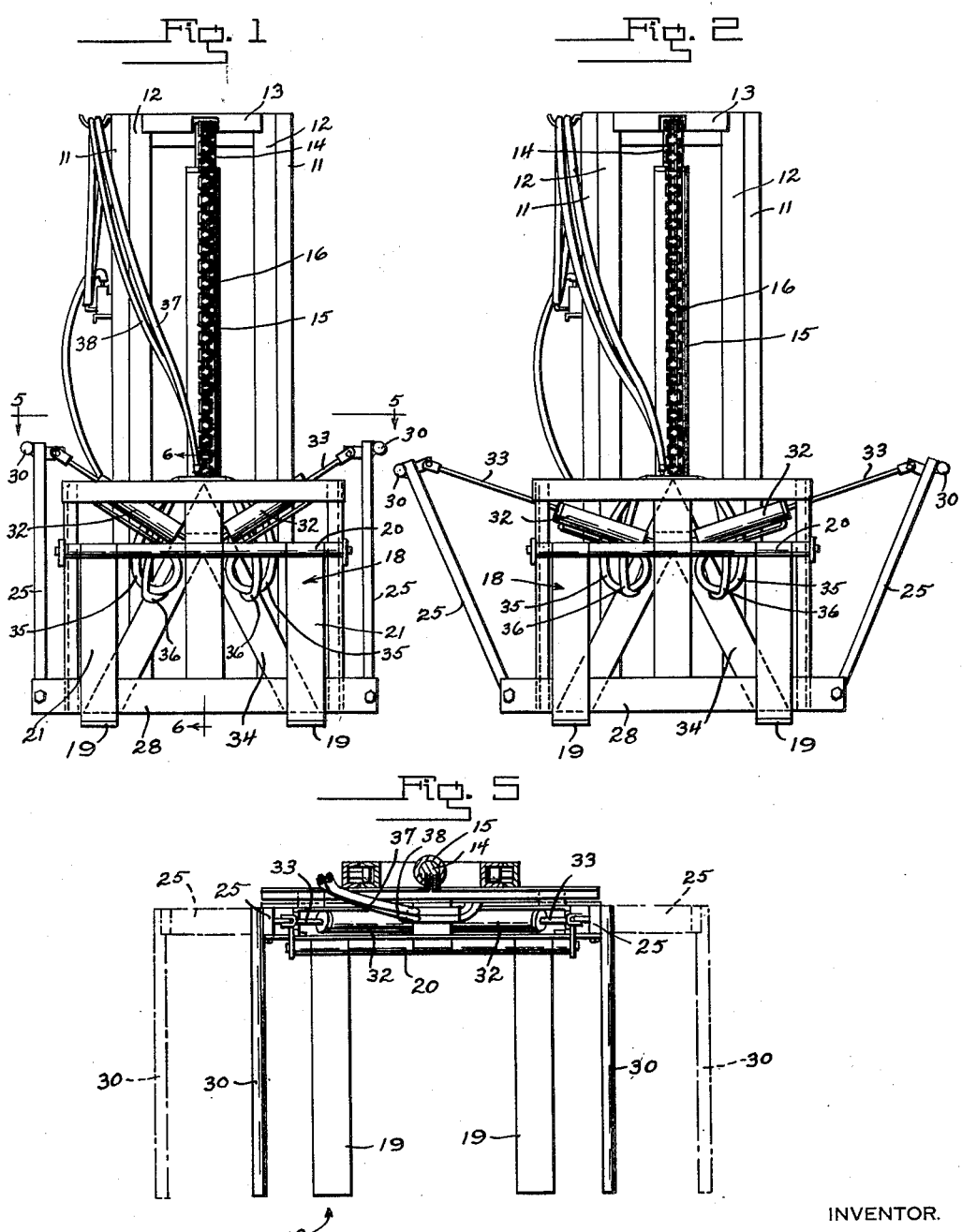
INVENTOR.
Radford B. Gunn, Jr.
BY
ATTORNEYS.

July 10, 1951  R. B. GUNN, JR  2,560,438
LOAD GRIPPER FOR VEHICLES SUCH AS LIFT TRUCKS
Filed Jan. 2, 1948  2 Sheets-Sheet 2
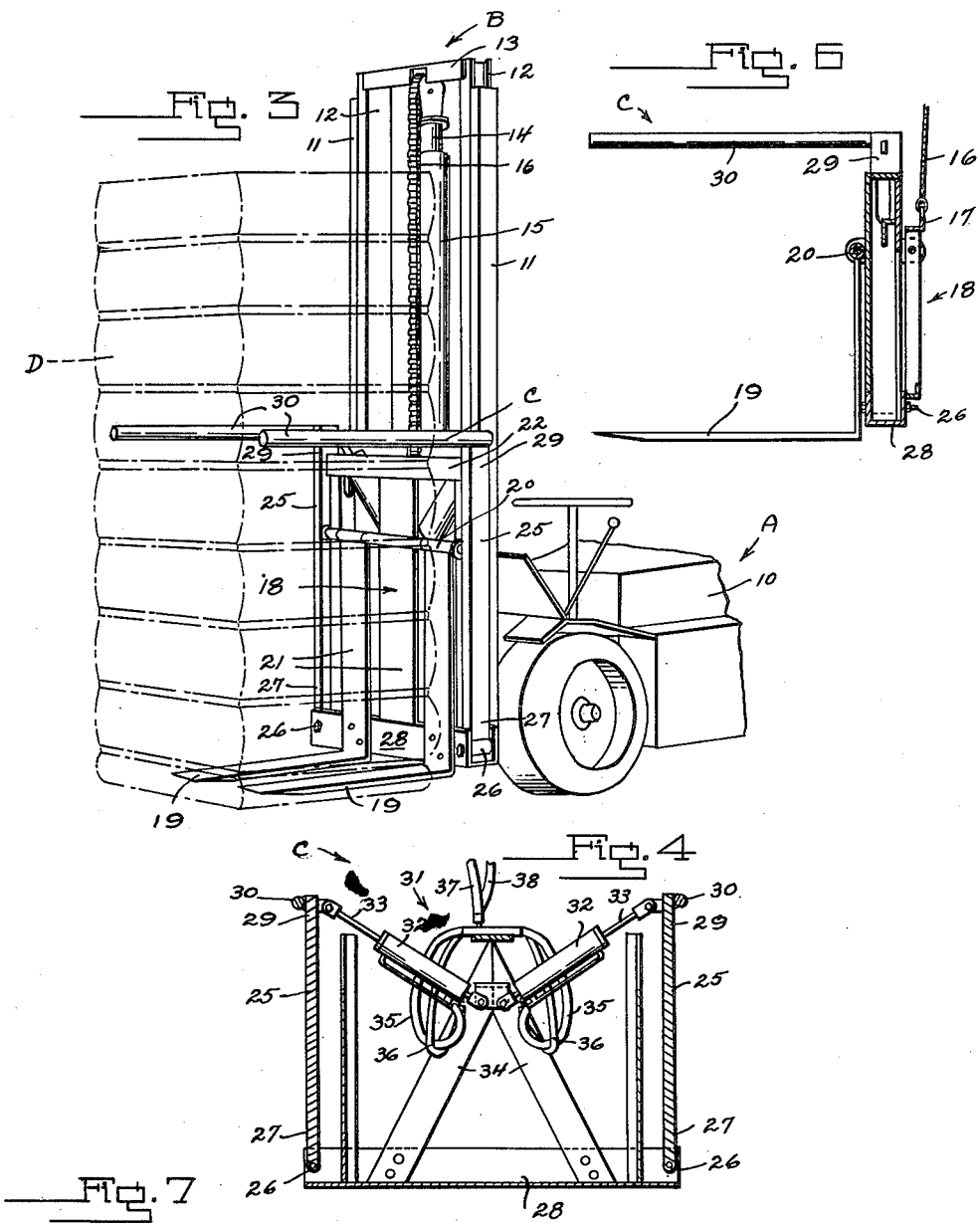
INVENTOR.
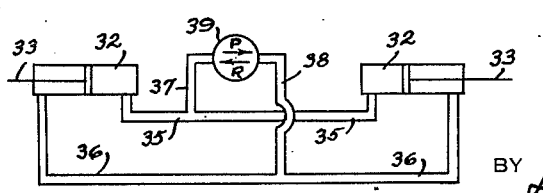
ATTORNEYS.

Patented July 10, 1951

2,560,438

UNITED STATES PATENT OFFICE 2,560,438

LOAD GRIPPER FOR VEHICLES SUCH AS LIFT TRUCKS

Radfird B. Gunn, Jr., Meridian, Miss.

Application January 2, 1948, Serial No. 159

2 Claims. (Cl. 214—66)

This invention relates to the handling of material, and more particularly to load handling apparatus for association with vehicles, such as a truck.

An important object of the invention is to provide such apparatus for gripping loads such as baled cotton, during raising, transporting and lowering such loads.

Another important object is to provide novel gripping means which will firmly grip and retain bulky, heavy and unwieldly loads, such as bales during transportation thereof.

Still another important object is to provide an apparatus, mounted upon a suitable vehicle, which apparatus is adapted to retain two bales or bundles of somewhat yielding material, such as baled cotton, one upon the other, or side-by-side and exert pressure thereon so that the two are squeezed into tight contact whereupon they may be transported by the vehicle without danger of being dislodged therefrom.

Not only does the novel apparatus grip the load, as bales, for transportation, but it is also adapted to grip them during their elevation from the surface, over which the vehicle travels, and also grip them during their lowering to the surface, when required.

Other objects and advantages of the invention will be apparent during the course of the following detailed description of the invention taken in connection with the accompanying drawings, forming a part of this disclosure, and in which drawings:

Figure 1 is a front elevation of the novel gripping apparatus in one position.

Figure 2 is a like view with the apparatus in another position.

Figure 3 is a perspective view of the novel apparatus mounted upon a vehicle and gripping a load comprising a bale of material.

Figure 4 is a rear elevation of the new apparatus.

Figure 5 is a top plan thereof.

Figure 6 is a vertical section of the lower portion of a load lifter and a lift and a portion of the novel gripping apparatus attached to the lift, taken on the line 6—6 of Fig. 1.

Figure 7 is a diagrammatic showing of a hydraulic system which may be employed with the novel gripping apparatus.

In the drawings wherein for the purpose of illustration is shown a preferred embodiment of the invention and wherein similar reference characters designate corresponding parts throughout the several views, the letter A designates a vehicle on which is mounted a conventional load lifter B, and the novel gripping apparatus C, for manipulation of the load B.

The vehicle A, shown in Figure 3, may be a wheeled one, such as a truck upon one end, such as the front end 10 of the chassis is mounted a conventional load lifter B including spaced-apart, stationary, substantially vertical supports 11 for slidably supporting a pair of vertically reciprocating runners 12, provided at their upper ends with a cross member 13, to which is secured the vertically-reciprocating rod 14 of hydraulic lift 15. The rod 14, adjacent its upper end rotatably supports a sprocket over which is trained a chain 16 with one end secured as shown in Figure 6, to a stationary portion 17 of the load lift B while the other or front end is secured to a lift 18 which may include forwardly-extending, horizontal load support 19, carried by a cross member 20, secured to a pair of vertical bracket members 21. There is also a cross head 22 to which the front end of the chain 16 is secured.

The gripping apparatus C includes a pair of spaced-apart arms 25 pivoted, as at 26, at a like lower end portion 27 of each to a support 28 which is preferably of channel iron formation, so that each will swing in a vertical plane toward and away from the other. Each arm 25 rigidly carries, at its upper end portion 29 opposite its end portion 27, an elongated, substantially horizontal finger or gripper member 30 which is, preferably, a round rod, with the two fingers in parallelism at all times and longitudinally facing one another. The support 28 is secured to the lift 18, as by being bolted to the lower end portions of the runners 12, so that the gripping apparatus moves with the lift 18. The lower ends of the bracket member 21 may be secured to the support 28.

Means 31, shown mainly in Figures 4 and 7, to actuate the arms 25 is preferably a pair of hydraulically-operated piston assemblies 32 with the rod 33 of one pivotally secured to one arm 25 at the upper end portion 29 thereof, where the finger or gripper member 30 is also carried, as shown in Figure 4, and the rod 33 of the other pivotally secured to the other arm 25. The housing of each piston assembly is pivotally carried by a suitable bracket 34 secured to the support 28 so that the arms may be swung to various positions inclined from the vertical. Referring mainly to Figure 7, each piston housing is fed fluid by a suitable tubular conduit 35 and there is also a second tubular conduit 36 for each piston housing, as is well known in the art, so that the piston head and rod may be slid in either direction with respect to its piston housing. A first flexible main conduit 37 is operatively connected with the conduits 35 and a second flexible main conduit 38 is operatively connected with the conduits 36, as is well known in the art. These conduits 37 and 38 may be operatively connected with a reversible pump 39.

When pressure fluid is fed from the pump 39, into the conduit 37, through the conduits 35 and into the piston assembly housings, the arms 25 carrying their fingers 30, will spread apart, substantially to the positions as in Figure 2 and the dot-and-dash positions in Figure 5, but when pressure fluid is fed through the conduits 36 into these housings, the arms 25 carrying the fingers 30, will swing toward each other, substantially to the positions shown in Figure 1 or the full line positions in Figure 5, or to intermediate positions, depending upon the width or height of the bale or bales disposed upon the load supports 19. In any case the fingers 30 will grip the side or end faces of the bale or bales and retain them upon the supports 19 during movements of the vehicle A. Upon reversal of the pump 39, as is well known in the art, pressure fluid will flow from the pump, through the main conduit 38, through the conduits 36, and into the piston assembly housings, the piston rods will force the arms 25 away from each other, and the fingers 30 out of contact with the load for release of the same.

Preferably, the fingers are cylindrical and may be fairly smooth surfaced, and when the load is, for example, a bale of cotton, the fingers will simply indent the bale surface progressively. This will cause even a very unwieldy bale (or, in fact, two bales placed side-by-side) to be very securely retained against falling from the moving vehicle or moving lift.

The load supports 19 may be eliminated under most circumstances for the pressure urged fingers will so tightly and securely grip the load that they, with the arms, can support the load during operation of the lift 18.

The directions in which the fingers 30 approach the load, i. e., along arcuate paths and with their longitudinal axes normal to the plane of the most forward face of the load, coupled with the preferably arcuate surfaces of the fingers tend to prevent damage to the load when gripped or released.

While it is desirable to position the load D so that it is well balanced with respect to the vehicle A, it will be noted that, with the arm actuating means 31 disclosed, one arm may swing farther toward the load than the other in the event the load is not balanced and, consequently both gripper members or fingers 30 will grip the load.

Various changes may be made to the form of the invention herein shown and described without departing from the spirit of the invention or scope of the claims.

What is claimed is:

1. In combination with a lift having a vertically-disposed portion, a gripper apparatus for gripping a load, including a substantially horizontal support; means mounting said support upon said lift portion at the lower end of said lift portion; a pair of spaced-apart arms; means pivotally mounting said arms, adjacent a like end of each, upon said support to extend above said support for movements toward and away from each other, including a pair of pivots; an elongated, horizontal finger carried by each arm and spaced from said end thereof, with said fingers in substantial parallelism and a side of one facing a side of the other; and means to move said arms upon their pivots to cause said fingers to grip the load when said load is disposed within the paths of travel of said fingers toward each other.

2. In combination with a lift, a gripper apparatus for gripping a load in position to be raised by said lift, including a substantially horizontal support; means mounting said support upon said lift; two spaced-apart arms carried by said support adjacent an end of each arm, at least one of said arms being pivotally carried by said support for pivotal movement toward and away from the other arm; an elongated substantially cylindrical finger carried by each arm, the fingers being in substantial parallelism at all times and longitudinally facing one another; and means to move the pivoted arm upon its pivot to cause the finger of said pivoted arm to selectively approach and recede from the finger of the other arm and into and out of arcuate gripping relationship with said load.

RADFIRD B. GUNN, Jr.

REFERENCES CITED

The following references are of record in the file of this patent:

UNITED STATES PATENTS

| Number | Name | Date |
|---|---|---|
| 1,221,765 | Penfield | Apr. 3, 1917 |
| 1,538,168 | Cochran | May 19, 1925 |
| 1,598,229 | Wilcox | Aug. 31, 1926 |
| 2,178,369 | Dunham | Oct. 31, 1939 |
| 2,323,605 | Johnson | July 6, 1943 |
| 2,403,356 | Francis | July 2, 1946 |
| 2,475,367 | Avery | July 5, 1949 |
| 2,509,023 | Vogel et al. | May 23, 1950 |